United States Patent Office 3,479,166
Patented Nov. 18, 1969

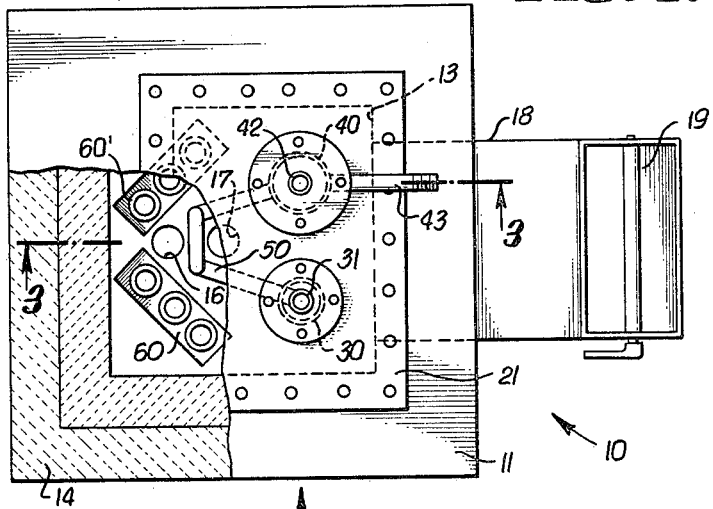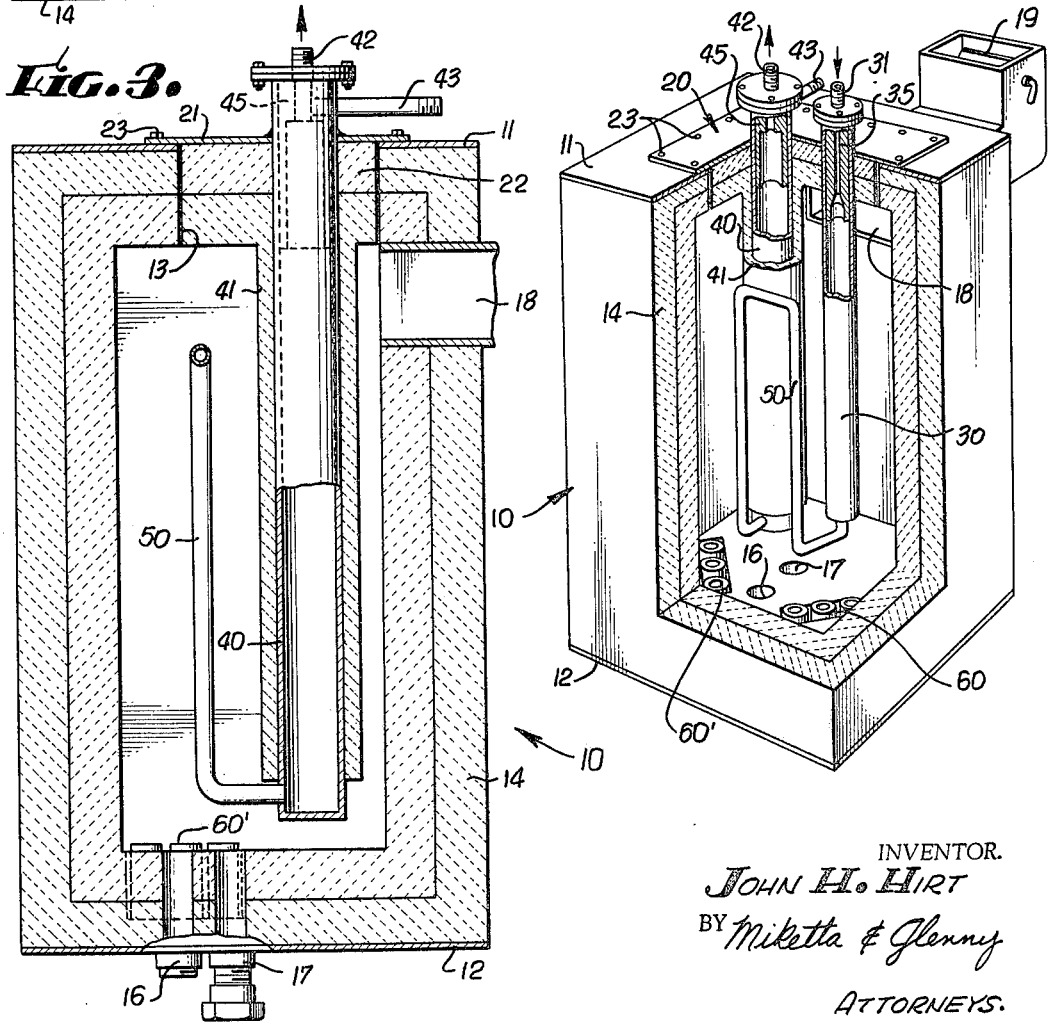

3,479,166
APPARATUS FOR PRODUCING GASES OF
PREDETERMINED CHARACTERISTICS
John H. Hirt, 1100 Ridgeside Drive,
Monterey Park, Calif. 91754
Filed May 1, 1964, Ser. No. 364,208
Int. Cl. C10k 3/02; B01j 9/00
U.S. Cl. 48—196                         6 Claims

ABSTRACT OF THE DISCLOSURE

An endothermic gas generator for continuously producing gases from air and hydrocarbon gases including means for preheating the intermixed gas and air to a selected temperature and including in a separate chamber a catalyst to which the heated gaseous mixture is exposed for reaction therewith to produce a gas of predetermined characteristics.

---

The present invention relates to a method of and apparatus for efficiently producing gases and more particularly to a method and apparatus for producing such gases endothermically under neutral, reducing and controlled conditions. These gases are used in many industrial operations, as in heating, annealing, hardening, sintering, etc. of metals and ceramics where the operation need be carried out in an atmosphere of predetermined characteristics and composition.

The usual endothermic gas generator includes a heating chamber containing a catalyst cell. In the operation of the generator a mixture of air and a hydrocarbon gas is passed through the cell and heated in the cell to a temperature usually between 1700° F. and 2000° F. The catalyst causes a reaction to occur which produces the neutral or reducing gases. When mixed air and a hydrocarbon gas such as methane is used, the reaction may be represented by the following formula:

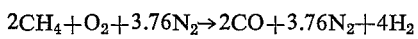

$$2CH_4 + O_2 + 3.76N_2 \rightarrow 2CO + 3.76N_2 + 4H_2$$

By increasing the oxygen content of the incoming mixture, varying the temperature, etc. a proportion of the CO may be converted to $CO_2$ and concurrently therewith a proportion of $H_2$ produced will be reduced to form water.

This desired reaction is seldom obtained in present endothermic gas generators without the production of undesirable quantities of contaminants such as carbon, water or other by-products. These contaminants are produced primarily because of the difficulty in controlling the ratio of the air to the fuel, improper and insufficient mixing, or because of the difficulty in controlling the heat within the catalytic cell. If there is an excess of fuel in the mixture or the mixture is not complete, carbon will be formed within this cell. The formation of carbon cuts down the rate of gas flow within the generator and will eventually clog the generator so that it will no longer operate. If excessive quantities of air are present in the mixture the product of the generator may have an undesirable oxidation potential.

In order to obtain a proper ratio of fuel to air many prior art generators have been directed toward introducing metered quantities of fuel and air into the chamber. It has generally been overlooked however, that the mixture of gases must be thorough in order to obtain a desired reaction. Even though the proper ratio is provided, if the mixture is not thoroughly mixed, there will be rich and lean portions within the mixture which will result in undesirable products of carbon and water.

In prior art generators, it has been attempted to heat the mixture of gases to reaction temperature within the catalytic cell itself. Since the reaction is generally endothermic, the cell was not at a uniform temperature, and the cell was inefficient, the reaction was incomplete and carbon was deposited in the cell, further rendering its effectiveness and requiring frequent shut downs.

The heating of the cell itself has also been a problem in the prior art. It is desirable that the cell be heated uniformly so that there will be no cool zones which will cause an incomplete reaction of the mixture. Some cells are heated by fuel oil or gas burners located within the heating chamber. Because the heat from such sources is so localized it has been very difficult to evenly heat the catalytic cell. Some generators have attempted to obviate this problem by eliminating oil or gas burners altogether and utilizing electric heating elements wound about the cell so that the heat is more evenly applied.

Because of these problems the prior art has long sought for a solution to reduce carbon accumulation. Many generators must be shut down periodically and burned free of the carbon before further operation. Other generators have been provided with means for periodically reversing the flow of gases so that the cool gases will engage the catalytic chamber at an opposite end and be at a sufficient temperature at the end containing the carbon to burn the carbon off. A further method has been to employ gas pressure responsive means for sensing an increase in pressure due to carbon accumulation which means will actuate an air valve to increase the air content in the mixture of gases so as to burn off the carbon in the catalystic cell. It is obvious that there has been no simple solution to removing the carbon once it has been deposited.

The present invention has provided a novel method and apparatus which effectively overcomes the problem of excessive carbon accumulation in an endothermic gas generator by going to the very source of the problem. This is accomplished by preheating the mixture of gases to a temperature between 1700° F. and 2000° F. prior to passing the mixture into the catalytic cell for reaction purposes. In the preferred embodiment the mixture of gases is passed through a heated tube within the chamber prior to entering the cell. The tube is heated sufficiently to bring the mixture to the reactive temperature, after which the mixture is passed into the cell.

Accordingly, the present invention utilizes the heat within the mixture itself for carrying out the reaction within the catalytic cell. Uniform, controlled temperatures within the cell are obtained by supplying an adequately preheated gas mixture to the cell, and only a relatively small additional proportion of heat through the walls of the cell. This is accomplished by surrounding the cell with a material which resists heat transfer.

Still further, the present invention insures that the gases are thoroughly mixed and sufficiently heated prior to entering the catalytic chamber. This is accomplished by providing a series of tubes which initially cause the mixture to flow at a relatively slow velocity while it is heated and then at a greater velocity along a path within the heating chamber which will insure that the mixture is sufficiently and uniformly heated. Variations in cross sectional area and a small diameter tube in final heating zone produce turbulent flow conducive to thorough premixing at a predetermined temperature prior to contact with a catalyst.

An object of the present invention therefore is to disclose and provide a compact efficient generator for the continuous conversion of hydrocarbon gases mixed with air into gases of predetermined characteristics.

A further object of the invention is to disclose and provide methods and constructions whereby the continuous production of gases or prepared atmospheres from mixtures of hydrocarbons and air can be readily attained without the undesirable formation of carbon and other deleterious products.

Again an object of the invention is to disclose and provide an assembly for use in a generator whereby cleaning and maintenance operations can be carried out without the necessity of dismantling the entire apparatus.

A further object of the invention is to disclose and provide conditions of temperature, velocity flow of gases and ratios which insure the production of gases in a continuous manner for prolonged periods of time without the necessity of changing catalysts.

Other objects and attendant advantages of this invention will be appreciated from the following description. For purposes of illustration reference will be had to the appended drawings in which:

FIG. 1 is a somewhat diagrammatic isometric view of an exemplary endothermic gas generator, portions of the housing being broken away in order to facilitate understanding.

FIG. 2 is a plan view of the generator, a portion being broken away to illustrate the internal arrangement of some of the parts.

FIG. 3 is a vertical section taken along a plane III—III in FIG. 2.

By referring to FIG. 1 it will be seen that the exemplary generator consists of a housing 10 having side walls and end portions so as to enclose a chamber. The ends of the generator may be provided with end plates 11 and 12, the upper end plate 11 being provided with an opening or port whose outlines are indicated at 13 adapted to receive and hold an assembly generally indicated at 20. Such assembly may include suitable mounting means 21 which may be in the form of a plate, such plate carrying the mixing and heating tube 30 and a reaction cell 40 as well as a preheating tube 50 shown as being generally U-shaped, such preheating tube being connected to and establishing communication between the inner ends of the mixing tube 30 and the catalytic or reaction cell 40. The elongated mixing tube 30 and the cell 40 are in parallel spaced relation, one end of the mixing tube and cell being attached to the mounting plate 21. The mounting plate 21 also carries a plug of refractory insulating material indicated at 22 adapted to fit into the port 13 so as to properly position the elements within the chamber. The mounting plate 21 may be welded to the tubular elements 30 and 40 and be connected to the end plate 11 in any suitable manner as for example by the bolts or machine screws 23.

The walls of the housing 10 are preferably provided with an external layer of heat insulating material indicated at 14 and an inner layer of highly refractory material; this inner lining may be in the form of tile blocks or it may be of a monolithic rammed type refractory composition.

Suitable heating means such as burners are provided preferably in the end of the housing opposite the mounting plate 21. In the illustrative example two banks of burners indicated at 60 and 60' are shown inset into the end wall 12, these burners being at an angle to the adjacent walls so as to direct their flames along and adjacent the longitudinal corner walls of the chamber to thereby heat the refractory lining as well as the heating tube 50, the refractory lining supplying radiant heat to the elements within the chamber. It will be understood that the burner elements are provided with suitable external sources of fuel, valves and other appurtenances whereby the amount of heat delivered to the chamber may be readily controlled. The lower end portion and header 12 may also include, suitably inserted through the insulating and refractory layers of the housing, temperature sensing means and means for visually observing the position and length of the flames and the conditions within the chamber. Such sensitive means and viewing means are generally indicated at 16 and 17. When the heat supplying means for burners are located at the bottom end of the housing the housing is preferably provided with a vent and associated stack adjacent the opposite or upper end. Such vent opening and associated stack are indicated at 18 and the stack is shown as being provided with a damper or control means 19.

The outer end of the initial preheating and mixing tube 30 is preferably flanged as shown and provided with inlet means 31 connected to a supply of hydrocarbon gas and air. Although such supply is not illustrated, it will be understood by those skilled in the art that suitable valves, pressure gages and meters may be employed in order to insure that a proper ratio of air to hydrocarbon gas is supplied to the generator. The lower or inner end of this initial mixing and preheating tube 30 is preferably closed except for a port which is in communication with one end of the preheating tube 50, which is of smaller cross-sectional area than the mixing tube 30. By thus providing a rapid change in cross section to the flow of gases through the tube and into the preheating tube 50 turbulent flow is insured and thorough mixing of the hydrocarbon gas with the air is attained.

The preheating tube 50 is in proximity to the heating means (or the flames therefrom and the radiant walls adjacent thereto) and is preferably convoluted so as to expose a considerable surface to the rapidly flowing stream of mixed gases therein. In the drawings the preheating tube 50 is shown as being generally U-shaped in form, the legs extending longitudinally in parallel relation to the initial preheating and mixing tube 30 and the reaction cell 40. The opposite end of the preheating tube 50 is connected to the lower end portion of the reaction cell 40 such lower or inner end of the cell being blanked or sealed off so that incoming gases can only travel through the tube 30, preheating tube 50 and into the reaction cell 40. It will be noted that the reaction cell 40 (which is carried by the mounting plate 21 and constitutes a part of the assembly of the removable assembly 20) is preferably made of a nickel alloy or contains a body of catalyst suitable to effect the desired reaction. Attention is called to the fact that the major portion of the length of such reaction cell 40 within the chamber of the generator is covered with a layer 41 of refractory material of low specific gravity and low specific heat. Since the reaction is only slightly endothermic in character, it is desirable to provide such a covering so that there will be a negligible transfer of heat between the reaction cell and the chamber thereby maintaining a substantially uniform temperature within the cell. Moreover, it is to be noted that the reaction cell 40 is of relatively large cross section so that the flow of gases through such cell is at a low velocity and adequate contact is established between the mixed gases and the catalyst in order to insure complete reaction. The outer end of the cell is also provided with a removable end plate and cooperating flange, the end plate including outlet means 42 through which the now product gases may be discharged to a suitable storage, etc.

It is to be understood that the inlet means 31 and the outlet means 42 are suitably threaded or otherwise arranged for rapid connection to other piping conduits and equipment. If desired, additional outlet means 43 may be provided directly into the reaction cell 40 so as to permit the product gases to be discharged to alternative storage facilities.

In order to facilitate mixing of incoming gases within the tube 30, its inlet end may be suitably lined as at 35, to provide a nozzle-like entrance channel. It is also desirable to line the discharge end portion of cell 40, as indicated at 45, with an insulating refractory (which may be a removable plug) to prevent undesirable heat loss.

In operation the entire chamber is brought up to a temperature of between 1700° F. and 2000° F., temperatures of 1800° F. being normally adequate. The generator is then supplied with a mixture of air and hydrocarbon gas, the ratio of air to hydrocarbon gas being dependent upon the ratio of CO to $CO_2$ desired in the product gas. The mixture of incoming gases is preferably supplied at a regulatable or controllable pressure and flow rate, the volumetric supply being correlated to the capacity and size of the generator. It will be found that in operation a minimum and theoretically no carbon will be formed or deposited in the mixing tube 30 or in the preheating tube 50 even though the latter is also made of an alloy containing nickel or nickel oxide. This surprising result is due to the fact that the preheating tube 50 is of sufficiently small cross section so as to permit an adequate heating of the gas without the generation or deposition or formation of carbon. The gases being discharged through the outlet means 42 will be found to consist essentially of carbon monoxide, carbon dioxide, nitrogen, hydrogen and water. The generator can be operated for longer periods of time than prior art generators without excessive formation of carbon in the reaction cell 40; it is desirable to have the inlet and outlet lines provided with pressure sensing devices whereby any excessive formation of carbon or blockage due to the presence of carbon will be reflected in a pressure drop and indicate that the unit requires care or cleaning. It will be noted that the construction of the generator is such that the entire assembly can be readily withdrawn from the housing by simply removing the upper mounting plate 21 and its connected elements.

Although the exemplary form of the generator illustrated is of rectangular section, it is to be understood that the invention is not limited thereto and different forms or shapes may be employed; any convoluted small diameter preheating tube located in proximity to the source of heat can be employed provided its ends are in communication with the incoming preheating tube of larger diameter and with a cell of also larger diameter or cross section. For example, splendid results have been attained by using a mixing tube of 3″ diameter, a preheating tube 50 of 1″ diameter and a cell 40 of 4″ diameter. As previously indicated, these changes in cross-sectional area of the various units play an important part in insuring thorough mixing of the gases and in regulating the flow in the various parts of the generator so as to attain most effective operation. At all events the mixture of gases should be preheated in the tube 50 to a temperature of between about 1700° F. and 2000° F. for most effective operation.

Many modifications and variations of the invention are possible in the light of the above teachings and all such modifications coming within the scope of the appended claims are embraced thereby.

I claim:

1. An efficient compact generator for the continuous conversion of hydrocarbon gases into gases of predetermined characteristics comprising: an insulated housing including end portions, said housing being lined with refractory composition and enclosing a chamber; heating means at one end of said chamber housing and vent means adjacent the other end of said housing; a removable conversion assembly carried by said other end of the housing, said assembly including an initial heating and mixing tube extending into said chamber, a cylindrical reaction cell extending into said chamber in spaced parallel relation to said heating and mixing tube, and convoluted preheating tube means connecting the inner ends of said initial heating and mixing tube and reaction cell within said chamber; means for supplying a mixture of hydrocarbon gases and air to the initial heating and mixing tube and outlet means for inert gases in communication with said reaction tube.

2. A generator as stated in claim 1 wherein said convoluted preheating tube means is of smaller cross-sectional area than said initial gas heating and mixing tube means and said reaction cell and is positionable in proximity to said heating means, whereby said mixture of hydrocarbon gas and air is subject to externally applied heat while said mixture is at high velocity.

3. An efficient compact generator for the continuous conversion of hydrocarbon gases into gases of predetermined characteristics, comprising: an elongated housing including end walls having an outer layer of insulation and an inner lining of refractory, enclosing a chamber; burner means positioned in one end wall, means for controllably supplying fuel to said burner means, and a vent in communication with the chamber adjacent the opposite end wall; a port in said opposite end wall; a removable conversion assembly adapted to be inserted into said chamber through said port, said assembly including mounting means for connecting said assembly to said end wall, said assembly comprising a tubular heating and mixing tube having an inner end extending into said chamber and an outer end adapted to be connected to a source of hydrocarbon gases and air, a reaction cell containing a catalyst and having an inner end portion extending into the chamber and an outer end for the discharge of said predetermined gases, and a generally U-shaped preheating tube means in communication with the inner ends of said mixing tube and reaction cell, the major portion of said tube means extending in parallel relation to said reaction cell.

4. A generator as stated in claim 3 wherein the housing is of rectangular section, and said burner means are positioned to direct flame along and adjacent longitudinal corner walls of said chamber to thereby subject said preheating tube means to radiant heat.

5. A generator as stated in claim 3 wherein the preheating tube means is of smaller cross section than said mixing tube and reaction cell whereby high velocity gas flow is attained in said preheating tube means; the housing is of rectangular section and said burner means are positioned to direct flame along and adjacent longitudinal corner walls of said chamber to thereby subject said preheating tube means to radiant heat.

6. An assembly for use in a heated chamber for the continuous conversion of a mixture of hydrocarbon gases and air into gases of predetermined characteristics comprising: a mounting plate carrying an elongated mixing tube and a tubular reaction cell in parallel relation, one end portion of said mixing tube and said cell being attached to said mounting plate, and a preheating tube connected to and establishing communication between the other ends of said mixing tube and reaction cell, said preheating tube being of smaller cross-section than said reaction cell and mixing tube and including a U-shaped portion extending in parallel relation to said mixing tube and cell whereby the entire assembly with its mounting plate can be readily removed from a heated chamber; and means for admitting gases into said mixing tube and means for discharging reactive gases from said cell.

References Cited

UNITED STATES PATENTS

| Re. 24,311 | 5/1957 | Mader | 48—196 |
| 2,304,203 | 12/1942 | Pyzel et al. | |
| 2,520,925 | 9/1950 | Garbo | 48—196 |
| 2,537,708 | 1/1951 | Scharmann | 23—212 |
| 2,692,193 | 10/1954 | Riesz et al. | 48—196 X |
| 2,707,147 | 4/1955 | Shapleigh | 48—212 X |
| 2,925,377 | 2/1960 | Mayer | 23—288 |
| 3,063,814 | 11/1962 | Shapleigh | 23—277 |
| 3,124,435 | 3/1964 | Byrne et al. | 48—214 X |
| 3,195,989 | 7/1965 | Pyzel | 48—212 X |

JOSEPH SCOVRONEK, Primary Examiner

U.S. Cl. X.R.

23—277, 281, 288; 122—356, 510